UNITED STATES PATENT OFFICE.

WALTER E. MASLAND, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

SOLVENT.

1,084,702.

Specification of Letters Patent. Patented Jan. 20, 1914.

No Drawing. Application filed October 5, 1912. Serial No. 724,033.

*To all whom it may concern:*

Be it known that I, WALTER E. MASLAND, of Wilmington, in the county of Newcastle, and in the State of Delaware, have invented a certain new and useful Improvement in Solvents, and do hereby declare that the following is a full, clear, and exact description thereof.

My invention relates particularly to the production of a new solvent or solvent mixture, which may be used in many different industries, but which is especially applicable to the production of nitrocellulose coatings, lacquer, artificial leather, bronzing liquors, patent leather, varnishes, etc.

As a concrete embodiment of my invention, I will describe it as applied to pyroxylin coatings. In producing coatings of this character, I have found it desirable to use a solvent for the nitrocellulose which is non-hygroscopic or hygroscopic to a very small degree; which has a high solvent power, and which is comprised of elements which will cause the coating to dry quickly, but which will result in the production of a tough, strong film. The former quality may be obtained by using a solvent mixture comprising a constituent which has a low boiling point, and which will therefore evaporate rapidly and enable the film to be dried as quickly as possible, and the latter quality is obtained by using a constituent which has a high boiling point and which will therefore evaporate slowly and result in producing a tough, strong film.

I have discovered that an especially advantageous solvent may be made by utilizing the diacetates such, for example, as amylene diacetate and hexylene diacetate, the diacetates being used as high boiling constituents of the solvent. These and similar diacetates are non-hygroscopic, and have excellent solvent properties and high boiling points. They are also miscible with the usual well-known solvents. Furthermore, they may be obtained at a very low cost. As an example of a solvent which may be used, a nitrocellulose solution may be made by dissolving nitrocellulose in a mixture of benzol and amylene and hexylene diacetates, a large percentage of the benzol being used and a comparatively small percentage of the diacetates being used. If desired, other low boiling constituents may be used as diluents instead of benzol, and various low boiling solvents may be used in connection with the diacetates, or the diacetates may be substituted in part by other high boiling solvents, as found most desirable for the particular coating composition to be produced.

While I have described my invention above in detail, I wish it to be understood that many changes may be made therein without departing from the spirit thereof.

I claim:

1. A solvent comprising a plurality of miscible solvent bodies including an alkylene diacetate.

2. A solvent comprising a plurality of miscible solvent bodies including an amylene diacetate.

3. A solvent comprising an alkylene diacetate and a low-boiling liquid miscible therewith.

4. A solvent comprising an amylene diacetate and a low-boiling liquid miscible therewith.

5. A solvent comprising an alkylene diacetate and benzol.

6. A solvent comprising an amylene diacetate and benzol.

7. A solvent comprising an alkylene diacetate and a low-boiling liquid miscible therewith, the latter being present in larger quantities than the diacetate.

8. A solvent comprising an amylene diacetate and a low-boiling liquid miscible therewith, the latter being present in larger quantity than the diacetate.

9. A solvent comprising an alkylene diacetate and benzol, the latter being present in larger quantity than the diacetate.

In testimony that I claim the foregoing I have hereunto set my hand.

WALTER E. MASLAND.

Witnesses:
C. R. MUDGE,
A. M. GORMAN.